(12) United States Patent
Katayama

(10) Patent No.: US 10,406,909 B2
(45) Date of Patent: Sep. 10, 2019

(54) CONTROL DEVICE FOR INTERNAL COMBUSTION ENGINE

(71) Applicant: DENSO CORPORATION, Kariya, Aichi-pref. (JP)

(72) Inventor: Naoki Katayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/575,132

(22) PCT Filed: May 18, 2016

(86) PCT No.: PCT/JP2016/064739
§ 371 (c)(1),
(2) Date: Nov. 17, 2017

(87) PCT Pub. No.: WO2016/190191
PCT Pub. Date: Dec. 1, 2016

(65) Prior Publication Data
US 2018/0141427 A1 May 24, 2018

(30) Foreign Application Priority Data
May 22, 2015 (JP) .................................. 2015-104381

(51) Int. Cl.
*B60W 10/06* (2006.01)
*B60K 6/485* (2007.10)
(Continued)

(52) U.S. Cl.
CPC ............. *B60K 6/485* (2013.01); *B60L 50/16* (2019.02); *B60L 50/50* (2019.02); *B60W 10/06* (2013.01);
(Continued)

(58) Field of Classification Search
CPC ....... B60K 6/485; B60W 20/13; B60W 10/06; B60W 10/08; B60W 10/26; B60L 11/14; B60L 11/18; F02D 17/00; F02D 29/02
(Continued)

(56) References Cited

U.S. PATENT DOCUMENTS

| 5,801,499 A | 9/1998 | Tsuzuki et al. |
| 2010/0229815 A1 | 9/2010 | Senda et al. |
| 2011/0001352 A1 | 1/2011 | Tamura et al. |
| 2011/0071740 A1* | 3/2011 | Nihei .................... F16D 48/066 701/54 |
| 2014/0091767 A1 | 4/2014 | Tamura et al. |

(Continued)

FOREIGN PATENT DOCUMENTS

| EP | 3054131 A1 * | 8/2016 | .............. F02N 11/04 |
| JP | 2000-205000 A | 7/2000 | |

(Continued)

OTHER PUBLICATIONS

Aug. 16, 2016 International Search Report issued in International Patent Application No. PCT/JP2016/064739.

*Primary Examiner* — Jacob D Knutson
(74) *Attorney, Agent, or Firm* — Oliff PLC

(57) ABSTRACT

A control device for an internal combustion engine for a vehicle having: an internal combustion engine; and an electric motor connected to an output shaft of the internal combustion engine and applying torque to the output shaft by use of electric power supplied from storage batteries. The control device automatically stops the internal combustion engine when an automatic stop condition is satisfied. The control device disables automatic stop from being carried out when an automatic stop disabling condition is satisfied. And the control device decreases an output of the internal combustion engine and increases an output of the electric motor when the automatic stop condition of the internal
(Continued)

combustion engine is disabled and when the automatic stop condition is satisfied but the automatic stop disabling condition is not satisfied.

11 Claims, 2 Drawing Sheets

(51) Int. Cl.
*B60W 10/08* (2006.01)
*B60W 10/26* (2006.01)
*F02D 17/00* (2006.01)
*F02D 29/02* (2006.01)
*B60W 20/13* (2016.01)
*B60L 50/50* (2019.01)
*B60L 50/16* (2019.01)

(52) U.S. Cl.
CPC .......... *B60W 10/08* (2013.01); *B60W 10/26* (2013.01); *B60W 20/13* (2016.01); *F02D 17/00* (2013.01); *F02D 29/02* (2013.01)

(58) Field of Classification Search
USPC .......................................................... 180/404
See application file for complete search history.

(56) References Cited

U.S. PATENT DOCUMENTS

| 2014/0114517 A1* | 4/2014 | Tani | B60W 10/06 |
| | | | 701/22 |
| 2015/0167614 A1* | 6/2015 | Malone | F02N 11/0822 |
| | | | 701/54 |
| 2015/0219214 A1* | 8/2015 | Kawamoto | F02D 17/00 |
| | | | 701/51 |

FOREIGN PATENT DOCUMENTS

| JP | 2000-265870 A | 9/2000 |
| JP | 2001-182581 A | 7/2001 |
| JP | 2003-293820 A | 10/2003 |
| JP | 2005-291158 A | 10/2005 |
| JP | 2007-208831 A | 8/2007 |
| JP | 2012-127315 A | 7/2012 |

* cited by examiner

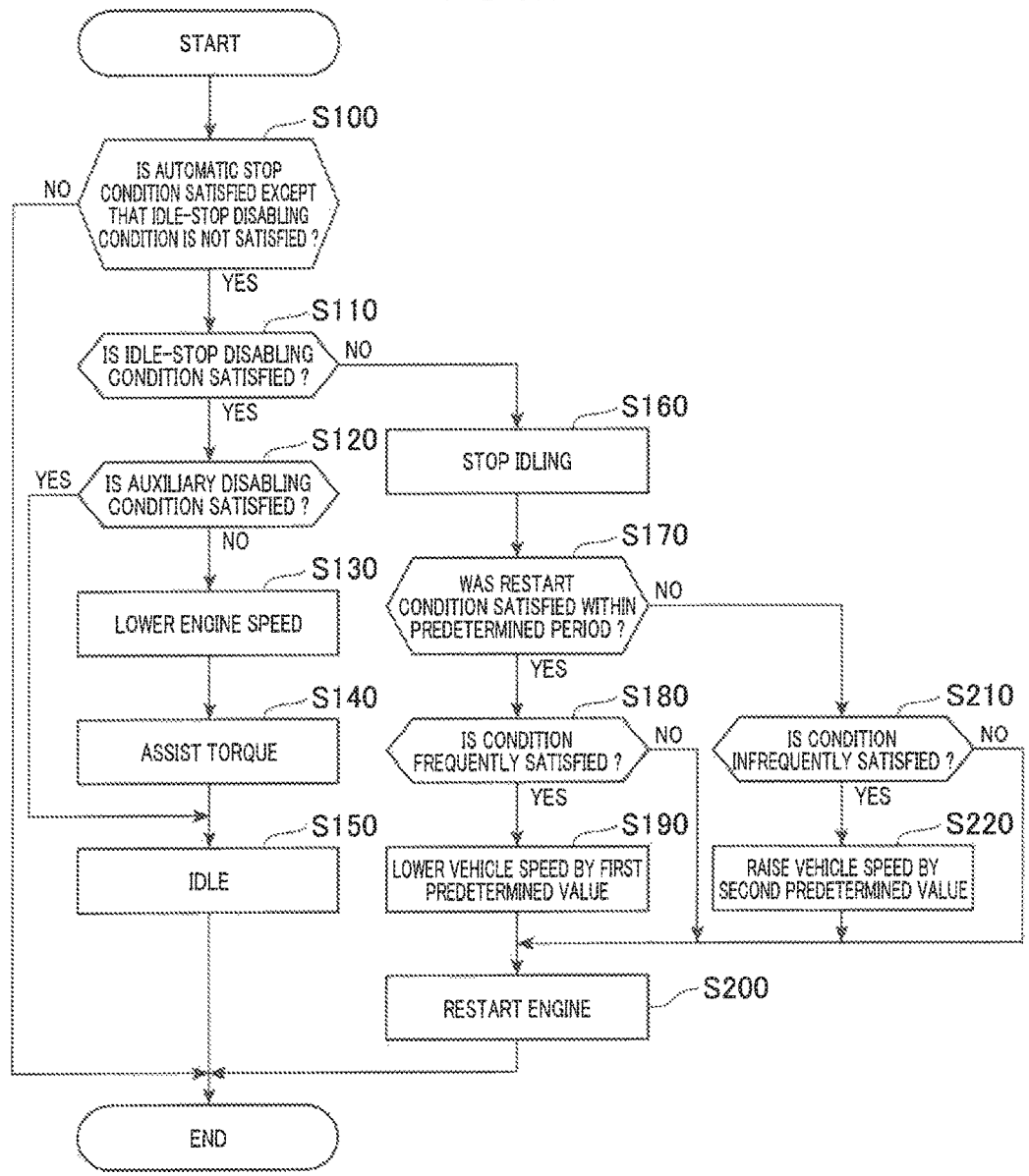

CONTROL DEVICE FOR INTERNAL COMBUSTION ENGINE

CROSS-REFERENCE TO RELATED APPLICATION

This application is based on and claims the benefit of priority from earlier Japanese Patent Application No. 2015-104381 filed on May 22, 2015, the description of which is incorporated herein by reference.

TECHNICAL FIELD

The present disclosure relates to a control technique for an internal combustion engine, and a control technique for idle control during a period in which idle stop (automatic stop of an internal combustion engine) is disabled.

BACKGROUND ART

For example, PTL 1 discloses a control device that disables idle stop and enables idle stop in a configuration of a vehicle employing idle stop, to reflect the driver's intention.

CITATION LIST

Patent Literature

[PTL 1] JP 2012-127315 A

SUMMARY OF THE INVENTION

Technical Problem

When a driver has disables idle stop, the control device described in PTL 1 idles an internal combustion engine until the driver permits idle stop. This results in fuel efficiency reduction (low fuel efficiency), compared with the case where the driver permits idle stop.

The present disclosure aims to provide a control device for an internal combustion engine which prevents lowering of fuel efficiency in a vehicle provided with an electric motor when the engine idles during an idle-stop disabling period.

Solution to Problem

The control device of the present disclosure is a control device for an internal combustion engine applied to a vehicle having: an internal combustion engine; and an electric motor connected to an output shaft of the internal combustion engine and applying torque to the output shaft by use of electric power supplied from a storage battery, the control device includes an automatic stop means, an automatic stop disabling means, and an auxiliary output means. The automatic stop means automatically stops the internal combustion engine when an automatic stop condition is satisfied. The automatic stop disabling means disables the automatic stop from being carried out by the automatic stop means when an automatic stop disabling condition is satisfied. The auxiliary output means reduces an output of the internal combustion engine and increases an output of the electric motor when automatic stop of the internal combustion engine is disabled by the automatic stop disabling means and when an automatic stop condition is satisfied except that the automatic stop disabling condition is not satisfied.

According to the above configuration, the control device of the present disclosure is applied to a vehicle equipped with an internal combustion engine and an electric motor that applies torque to an output shaft of the internal combustion engine. The control device of the present disclosure includes an automatic stop means for automatically stopping the internal combustion engine (stopping idling) when an automatic stop condition is satisfied. Further, the control device of the present disclosure includes an automatic stop disabling means that disables the automatic stop means from automatically stop the internal combustion engine when an automatic stop disabling condition is satisfied. In such a configuration, the automatic stop disabling means may disable automatic stop and therefore permit idling of the internal combustion engine. In this case, fuel efficiency is reduced (lowered), compared with the case where the internal combustion engine is automatically stopped. The control device of the present disclosure decreases an output of an internal combustion engine and increases an output of the electric motor through the auxiliary output means when the automatic stop disabling means disables automatic stop and when an automatic stop condition is satisfied but the automatic stop disabling condition is not satisfied. Accordingly, the control device of the present disclosure prevents lowering of fuel efficiency when an engine idles during an idle-stop disabling period in a vehicle provided with an electric motor.

BRIEF DESCRIPTION OF THE DRAWINGS

FIG. 2 is a flowchart of a control process of an ECU according to the present embodiment.

DESCRIPTION OF THE EMBODIMENTS

Figure 1:
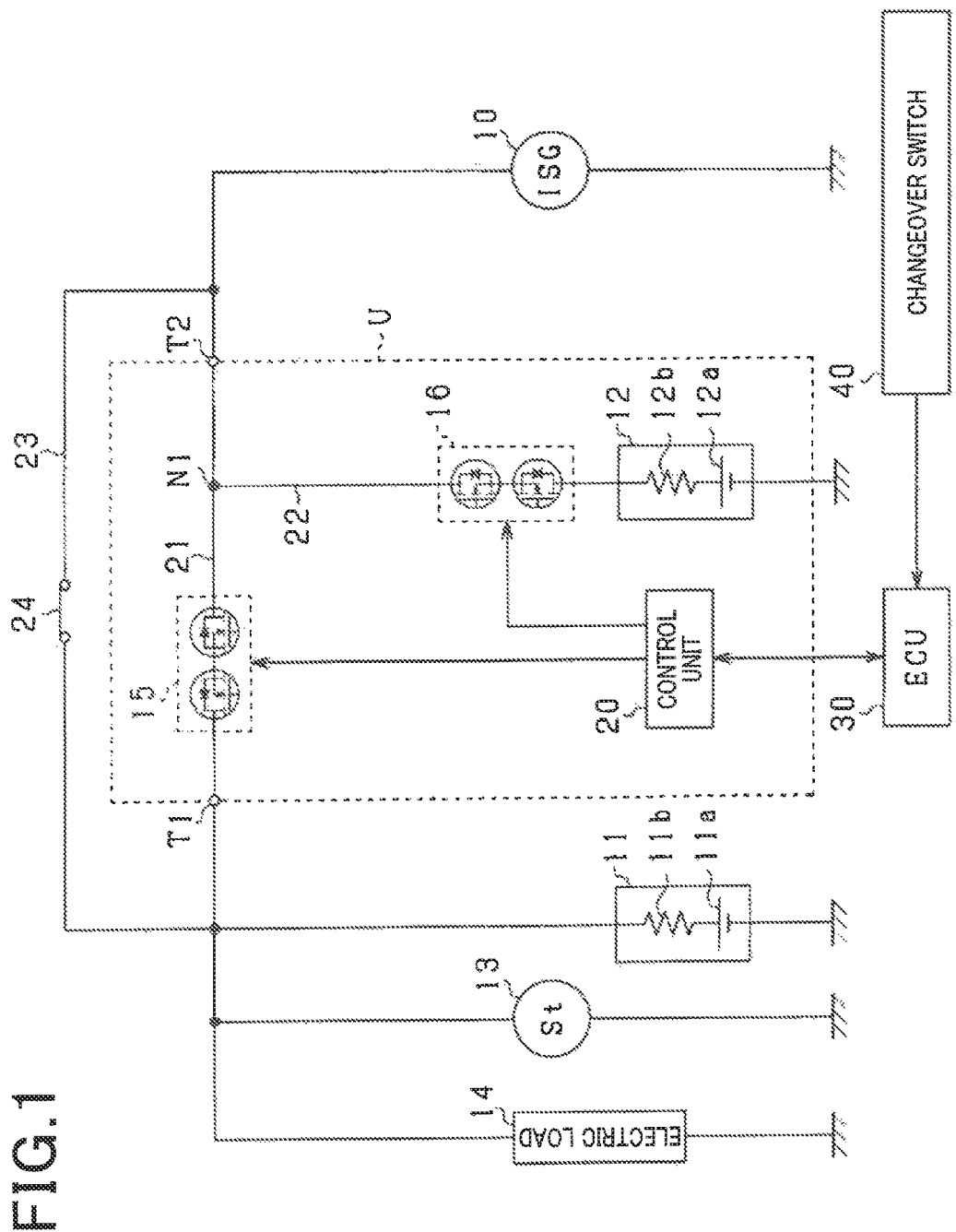
FIG. 1 is a schematic view of a peripheral configuration of an internal combustion engine according to the present embodiment.

Embodiments of the technique of the present disclosure will be described hereinafter with reference to the drawings. The vehicle according to the present embodiment is mainly driven by an engine corresponding to the internal combustion engine of the present disclosure. Further, the vehicle includes an on-vehicle power supply device (hereinafter referred to as a "power supply system") and has an idle-stop function for automatically stopping the internal combustion engine.

As shown in FIG. 1, the power supply system according to the present embodiment includes an integrated starter generator (ISG) 10 corresponding to the electric motor of the present disclosure, a lead storage battery 11, and a lithium-ion storage battery 12. The power supply system includes a starter (St) 13, an electric load 14, an MOS switch 15, an SMR switch 16, and the like. The lithium-ion storage battery 12, the MOS switch 15, and the SMR switch 16 are housed in the same casing (for example, one housing case) to be integrated and configured as a battery unit U. The battery unit U includes a control unit (battery control means) 20 for switching ON/OFF the MOS switch 15 and the SMR switch 16. The control unit 20 is housed in the chassis, being mounted on a substrate together with the MOS switch 15 and the SMR switch 16.

The battery unit U is provided with a first terminal T1 and a second terminal T2 (a plurality of external terminals). The first terminal T1 is connected to the lead storage battery 11, the starter 13, and the electric load 14 via a predetermined electric path, and the second terminal T2 is connected to the ISG 10 via a predetermined electric path. The first and second terminals T1 and T2 also serve as input/output terminals (high current input/output terminals) through which an input/output current of the ISG 10 flows.

The ISG 10 has a rotating shaft which is connected to an output shaft of the engine by a belt and the like, and can be driven in conjunction with the output shaft. Accordingly, the rotating shaft of the ISG 10 is rotated by rotation of the output shaft of the engine, and the output shaft of the engine is rotated by rotation of the rotating shaft of the ISG 10. Thus, the ISG 10 is configured to have a power generating function of generating electric power (performing regenerative power generation) with energy generated by rotation of the output shaft of the engine or an axle or the like, and a power output function (torque assisting function) of applying torque to the output shaft of the engine.

The lead storage battery 11 and the lithium-ion storage battery 12 are electrically connected in parallel to the ISG 10. The lead storage battery 11 and the lithium-ion storage battery 12 are therefore charged by electric power generated by the ISG 10, and the ISG 10 is driven by power supplied from the lead storage battery 11 and the lithium-ion storage battery 12.

The lead storage battery 11 is a well-known general purpose storage battery, while the lithium-ion storage battery 12 is a (high-density) storage battery that has a lower power loss during charging/discharging and boasts output density and energy density higher than those of the lead storage battery 11. The storage battery 11 contains lead dioxide ($PbO_2$) as a positive-electrode active material, lead (Pb) as a negative-electrode active material, and sulfuric acid ($H_2SO_4$) as an electrolyte. The lead storage battery 11 has a plurality of battery cells connected in series, the battery cells configured by such electrodes and an electrolyte.

The lithium-ion storage battery 12 contains an oxide containing lithium (lithium metal composite oxide) as a positive-electrode active material. Examples of the oxide containing lithium include lithium cobalt oxide ($LiCoO_2$), lithium manganate ($LiMn_2O_4$), lithium nickel oxide ($LiNiO_2$), lithium iron phosphate ($LiFePO_4$) and the like. The lithium-ion storage battery 12 contains an alloy or other material containing carbon (C), graphite, lithium titanate (for example, $Li_xTiO_2$), silicon (Si) or tin (Sn). As the electrolyte, the lithium-ion storage battery 12 contains an organic electrolyte. In the lithium-ion storage battery 12, a plurality of battery cells configured by such electrodes and an electrolyte are connected in series.

Reference signs 11a and 12a of FIG. 1 represent a battery cell assembly of the lead storage battery 11 and of the lithium-ion storage battery 12, respectively. Further, reference signs 11b and 12b represent an internal resistance of the lead storage battery 11 and of the lithium-ion storage battery 12, respectively.

The electric load 14 includes a constant-voltage-requiring load, such as a load that requires a voltage of a supply power to be generally constant or a load that requires a voltage of supplied power to vary at least within a predetermined range and to be stable. Examples of such a constant-voltage-requiring load include a navigation device, an audio device and the like.

Stabilizing the voltage variation of the supplied power in the present power supply system described enables the device corresponding to the constant-voltage-requiring load to achieve stable operation. Examples of other constant-voltage-requiring loads include a headlight, a wiper, a blower fan of an air conditioner, and a rear-windshield heater. The headlight, wiper, blower fan and the like are affected if there is a change in voltage of supplied power. That is, the headlight would flicker, the wiper would operate at a different speed, and the blower fan would rotate at a different speed (would make a different blowing sound). Hence the voltage variation of supplied power in these devices is required to be kept constant.

The battery unit U is provided with a first connection path 21 and a second connection path 22 (a plurality of electrical paths) that mutually connect a first terminal T1, a second terminal T2, and a lithium-ion storage battery 12. The first connection path 21, which connects between the first terminal T1 and the second terminal T2 is provided with a MOS switch 15 (opening/closing means). The second connection path 22, which connects the lithium-ion storage battery 12 to a connection point N1 (battery connection point) of the first connection path 21 is provided with an SMR switch 16. The MOS switch 15 and the SMR switch 16 include 2×n MOSFETs (semiconductor switches). Further, the MOS switch 15 and the SMR switch 16 are connected in series so that parasitic diodes of a pair of MOSFETs are oppositely directed. Thus, in the present power supply system, the parasitic diodes completely interrupt currents flowing through the first and second connection paths 21 and 22 respectively having the MOS switch 15 and the SMR switch 16 provided, in the case where these switches are turned off (in an open state).

The present power supply system is provided with a bypass 23 for connecting between the lead storage battery 11 and the ISG 10 without the MOS switch 15 intervening. The bypass path 23 bypasses the battery unit U to electrically connect between the electrical path connected to the first terminal T1 (path on the lead storage battery 11 side) and the electrical path connected 6 to the second terminal T2 (path on the ISG 10 side). Further, the bypass path 23 is provided with a bypass switch 24, which electrically connects or disconnects between the lead storage battery 11 side and the ISG 10 side. The bypass switch 24 is a normally closed type relay switch. The bypass path 23 and the bypass switch 24 may be provided inside the battery unit U so as to bypass the MOS switch 15.

The control unit 20 turns ON/OFF (closes/opens) the MOS switch 15 and the SMR switch 16 separately. The control unit 20 turns ON/OFF the MOS switch 15 according to a predetermined control condition. Specifically, the control conditions include: whether a battery is discharging to power the electric load 14 (whether the electric load 14 is operating); whether a battery is being charged by power supply from the ISG 10; and whether the control unit 20 is automatically restarting the engine with the ISG 10 in an engine off state attained by the idle-stop control. The control unit 20 controls ON/OFF switching of the SMR switch 16 as follows: basically keeps the SMR switch 16 ON (closed) on normal occasions, and turns the SMR switch 16 OFF on an occasion when any abnormality occurs in the battery unit U, the ISG 10, or other component.

The control unit 20 is connected to an ECU 30 provided outside the battery unit U and corresponding to the control device of the present disclosure. The control unit 20 and the ECU 30 are connected via a CAN or other communication network for mutual communication. The present power supply system thus shares various data stored in the control unit 20 and the ECU 30. The ECU 30 has a function of carrying out engine control including idle stop (automatic stop and restart of the engine). The engine control according to the present embodiment automatically stops the engine (by means of an automatic stop means) when a predetermined automatic stop condition is satisfied. The engine control also automatically restarts the engine (by means of an automatic restarting means) when a predetermined restart condition is satisfied. In the present power supply system, the ECU 30 thus functions as an automatic stop means and a restarting means.

In the present power supply system, the ECU 30 is further connected to a changeover switch 40 for enabling or disabling idle stop (automatic stop of the engine). The changeover switch 40 is switched from an enabled state (OFF state) to a disabled state (ON state), for example, when it is pressed by the driver. In other words, the changeover switch 40 serves as a user interface for enabling or disabling idle stop. Then the driver indicates his/her intention whether to disable idle stop. In response to a request to disable idle stop, the power supply system transmits to the ECU 30 a signal requesting to disable idle stop. In response, the ECU 30 disables automatic stop of the engine (by means of an automatic stop disabling means). The ECU 30 thus accepts an idle-stop disabling instruction from the driver via the changeover switch 40 and disables automatic stop of the engine. Additionally, the ECU 30 reduces the output of the engine and increases the output of the ISG 10 (by means of an auxiliary output means), thereby carrying out control for the ISG 10 to assist the engine output (torque assisting control for the ISG 10 to apply torque to the output shaft of the engine). Further, the ECU 30 may disable the ISG 10 from assisting the engine output (by means of an auxiliary disabling means). In the present power supply system, the ECU 30 thus serves as an automatic stop disabling means, an auxiliary output means, and an auxiliary disabling means.

The ISG 10 generates electric power using rotational energy of the output shaft of the engine. The electric power generated in the ISG 10 is supplied to the electric load 14, and is supplied to the lead storage battery 11 and the lithium-ion storage battery 12 for charging. When the engine stops and generates no electric power in the ISG 10, electric power is discharged and supplied from the lead storage battery 11 and the lithium-ion storage battery 12 to power the electric load 14. Discharge amount and charge amount of the lead storage battery 11 and the lithium-ion storage battery 12 are calculated based on SOC (state of charge; a ratio of an actual charge amount to a charge amount in a fully charged state) and controlled within a range where the batteries do not overcharge or overdischarge (SOC usage range).

The ISG 10 generates electric power with regenerative energy during deceleration (e.g., during braking operation) of the traveling vehicle. The electric power generated in the ISG 10 is charged in the lead storage battery 11 and the lithium-ion storage battery 12 (mainly in the lithium-ion storage battery 12). The present power supply system thus carries out regenerative power generation and regenerative charging during deceleration of the traveling vehicle. Regenerative power generation and regenerative charging are carried out when the following conditions are satisfied, including: that the traveling vehicle is decelerating (in deceleration), and that no fuel is injected to the engine (when fuel injection is cut off).

Assume here that, in a vehicle, for example, the driver turns ON the changeover switch 40 to disable idle stop. In this case, even if an automatic engine-stop condition is satisfied, it is forbidden to automatically stop the engine (idle stop is disabled). In other words, the engine idles until the disablement of idle stop is canceled. This results in fuel efficiency reduction (lowering of fuel efficiency) compared with the case where the engine is automatically stopped (idle stop is carried out).

In the present embodiment, the ECU 30 carries out the control processes shown in FIG. 2.

During the course of the processes, the ECU 30 reduces the engine output and increases the output of the ISG 10 if an automatic engine-stop condition is satisfied while disablement of idle stop is effective. Accordingly, the present embodiment prevents lowering of fuel efficiency in a vehicle provided with the ISG 10 when the engine idles during an idle-stop disabling period.

With reference to FIG. 2, the control processes (engine control processes) of the ECU 30 according to the present embodiment will be described below. The processes shown in FIG. 2 are cyclically executed by the ECU 30 as long as the power supply is ON.

When the power supply system is actuated, the ECU 30 determines whether an automatic engine-stop condition is satisfied (S100). The automatic stop conditions herein include a driving operation, a vehicle condition and the like, requiring idle stop. Specifically, the conditions include that:

[i] An accelerator pedal operation amount Acc (depressed amount of an accelerator pedal) is less than a predetermined reference operation amount Acc0 and the pedal is in an OFF state (Acc<Acc0 (predetermined value));

[ii] A traveling vehicle speed ve is less than a predetermined reference speed ve0 (ve<ve0 (predetermined value)); and

[iii] An idle-stop disabling condition (automatic stop disabling condition) is not satisfied.

The ECU 30 determines whether at least one of the conditions [i] and [ii] except [iii] is satisfied. When at least one of the conditions [i] and [ii] is satisfied, the ECU 30 determines that an automatic engine stop condition has been satisfied. An automatic stop condition according to the present embodiment includes the above conditions except that the idle-stop disabling condition is not satisfied. The present process thus determines whether the automatic stop condition (the automatic stop condition except that the disabling condition is being unsatisfied) is satisfied.

If the ECU 30 determines that the automatic stop condition is not satisfied except that an idle-stop disabling condition is not satisfied (NO in S100), the ECU 30 continues the current engine driving and terminates the present processes. If the ECU 30 determines that the automatic stop condition is satisfied except that an idle-stop disabling condition is not satisfied (YES in S100), the process proceeds to the S110.

The ECU 30 determines whether an idle-stop disabling condition is satisfied (S110). The idle-stop disabling conditions herein include acceptance of an idle-stop disabling request, a vehicle condition requiring disablement of idle-stop, and the like. Specifically, the conditions include that:

[1] The changeover switch 40 is ON (idle-stop is disabled in response to a disabling instruction from the driver);

[2] The vehicle is traveling on a road (slope or step) that is steeper than a predetermined reference gradient; and

[3] Vehicle starting responsiveness is required.

The vehicle starting responsiveness is required, for example, in a situation where the driver temporarily stops the vehicle midway through the right or left turn at an intersection (in the case where the manipulated variable of steering wheel is larger than a predetermined turning amount). In such a situation, the driver merely temporarily stops the vehicle for safety confirmation, and is likely to start the vehicle immediately after confirming travelling safety, which means that the driver needs to restart the engine soon even if it automatically stops. Thus, automatic stop of the engine may possibly result in fuel efficiency reduction (lowering of fuel efficiency) compared with the case where the engine does not automatically stop. Hence, in the present embodiment, a situation that requires vehicle starting responsiveness is set as one of the idle-stop disabling conditions. The ECU 30 determines whether at least one of the conditions [1] to [3] is satisfied. When at least one of the conditions [1] to [3] is satisfied, the ECU 30 determines that an idle-stop disabling condition has been satisfied.

If the ECU 30 determines that an idle-stop disabling condition is satisfied (YES in S110), the process proceeds to the S120. At this time, a lower limit of an allowable range of capacity (range of capacity that is allowed to be used in a normal state) of each of the lead storage battery 11 and the lithium-ion storage battery 12 of the present embodiment is lowered by a predetermined value.

The ECU 30 determines whether an auxiliary disabling condition, which disables the ISG 10 to assist torque (assist an engine output) is satisfied (S120). The auxiliary disabling conditions herein include a vehicle condition and the like, requiring disablement of torque assistance. Specifically, the conditions include that:

[a] A period of time during which at least one of the lead storage battery 11 and the lithium-ion storage battery 12 is disabled from charging (no-charging period) is predicted to be longer than a predetermined period (second predetermined period) (the no-charging period>the second predetermined period);

[b] At least one of the lead storage battery 11 and the lithium-ion storage battery 12 is predicted to discharge more than its charged amount (discharged amount>charged amount); and

[c] A remaining capacity SOC both, not either the lead storage battery 11 and the lithium-ion storage battery 12 is smaller than a predetermined reference capacity SOC0 (SOC<SOC0 (predetermined value)).

The ECU 30 determines whether at least one of the conditions [a] to [c] is satisfied. When at least one of the conditions [a] to [c] is satisfied, the ECU 30 determines that an auxiliary disabling condition has been satisfied.

If the ECU 30 determines that an auxiliary disabling condition is satisfied (YES in S120), the process proceeds to S150. The ECU 30 then carries out normal idling with no torque assistance by the ISG 10 (S150). If the ECU 30 determines that no auxiliary disabling condition is satisfied (NO in S120), the process proceeds to S130. The ECU 30 then lowers an engine speed during the idling period (reduces an engine output) (S130) before proceeding to S140.

The ECU 30 causes the ISG 10 to provide assist torque (S140). Specifically, the ECU 30 causes the ISG 10 to apply as much torque as required to compensate for the lowered engine speed to an output shaft of the engine, thereby assisting the engine output. The ECU 30 then idles the engine with the ISG 10 assisting torque (S150). Thus, in the present process, an output of the ISG 10 compensates for an engine output reduced due to the lowered engine speed.

If the ECU 30 determines that no idle-stop disabling condition is satisfied (NO in S110), the process proceeds to the S160. The ECU 30 then stops the engine and carries out idle stop (S160) before proceeding to the S170.

The ECU 30 determines whether the elapsed time from execution of idle stop to satisfaction of a restart condition of the engine (period of time that elapsed before satisfaction of a restart condition) is within a predetermined period (within a first predetermined period) (S170). Exemplary restart conditions herein include a condition that an accelerator manipulated variable Acc is larger than a predetermined reference operating amount Acc0 (Acc>Acc0). In the present embodiment, a period of time that provides better energy efficiency by idling the engine rather than by automatically stopping (stopping idling) the engine is set as a predetermined period (first predetermined period). If the ECU 30 determines that the period of time that elapsed before the satisfaction of a restart condition is within the predetermined period (the first predetermined period) (YES in S170), the process proceeds to the S180. The ECU 30 then determines whether the frequency of satisfying a restart condition within a predetermined time period is high (higher than a predetermined frequency) (S180). Specifically, the ECU 30 counts the number of times it has determined that a restart condition is satisfied within the predetermined time (the number of positive determinations). The ECU 30 then determines whether the count of positive determinations is larger than the first predetermined number of times, which represents a reference frequency of satisfying a condition. The ECU 30 initializes the count of positive determinations (resets the count) if it determines that the period that elapsed before satisfaction of a restart condition is satisfied is not within the predetermined time before determining that the number of positive determinations is larger than the first predetermined number of times.

If the ECU 30 determines that no restart condition is frequently satisfied within the predetermined period (NO in S180), the process proceeds to the S200. The ECU 30 then restarts the engine (S200) and terminates the present processes. On the other hand, if the ECU 30 determines that a restart condition is frequently satisfied within the predetermined period (YES in S180), the process proceeds to the S190. The ECU 30 then lowers the value of the reference speed ve0 of the automatic stop condition [ii] by the first predetermined value (S190) before restarting the engine (S200).

If the ECU 30 determines that the period of time elapsed before satisfaction of a restart condition is not within the predetermined period (the first predetermined period) (NO in S170), the process proceeds to S210, where the ECU 30 determines whether the frequency of satisfying a restart condition within a predetermined time period is low (lower than a predetermined frequency) (S210). Specifically, the ECU 30 counts the number of times it has determined that no restart condition is satisfied within the predetermined time (the number of negative determinations). The ECU 30 then determines whether the count of negative determinations is less than the second predetermined number of times, which represents a reference count of satisfying a condition. The ECU 30 initializes the count of negative determinations if it determines that the period elapsed before satisfaction of a restart condition is within the predetermined time before determining that the number of negative determinations is smaller than the second predetermined number of times.

If the ECU 30 determines that the frequency of satisfying a restart condition within the predetermined period is not low (NO in S210), the process proceeds to the S200. The ECU 30 then restarts the engine (S200) and terminates the present processes. On the other hand, if the ECU 30 determines that the frequency of satisfying a restart condition within the predetermined period is low (YES in S210), the process proceeds to the S220. The ECU 30 then raises the value of reference speed ve0 of the automatic stop condition [ii] by the second predetermined value (S220) before restarting the engine (S200).

In the S180 and S210, the ECU 30 initializes the count of the number of determination times when it determines that the frequency of satisfying a restart condition within the predetermined period is high or low.

With the above configuration, the control device (ECU 30) according to the present embodiment achieves the following advantageous effects.

When an idle-stop disabling condition is satisfied, idle stop is disabled, and the engine is allowed to idle. In this case, fuel efficiency is reduced (fuel efficiency is lowered) compared with the case where idle stop is carried out. The control device according to the present embodiment reduces the output of the engine and increases the output of the ISG 10 when idle stop is disabled by satisfaction of an idle-stop disabling condition and when an automatic stop condition is satisfied but an idle-stop disabling condition is not satisfied. Thus, in a vehicle provided with an electric motor, the control device according to the present embodiment prevents lowering of fuel efficiency during an idle-stop disabling period.

Idle-stop disabling conditions include a condition that the changeover switch 40 for switching whether to disable idle stop is in an ON state (idle stop is disabled). The changeover switch 40 is provided, for example, near the driver's seat. The driver can make a request for disabling idle stop by depressing the changeover switch 40. The control device disables idle-stop in response to this request. The control device according to the present embodiment carries out the control processes described above even when idle stop is disabled by the user's request. This can minimize lowering of fuel efficiency.

Idle-stop disabling conditions include a condition that the vehicle is traveling on a road that is steeper than a predetermined reference gradient. For example, when idle stop is carried out while the vehicle is climbing an ascending slope that is steeper than a predetermined reference gradient, it takes time before the vehicle obtains enough driving force to climb the ascending slope (obtains a hill-climbing force) after restart of the engine. As a result, the vehicle may fail to obtain a sufficient driving force, possibly slipping backwards down the road. Idle stop is hence disabled under such a condition. The control device according to the present embodiment carries out the control processes described above even when idle stop is disabled due to the vehicle's traveling uphill. This can minimize lowering of fuel efficiency. Further, when idle stop is carried out while the vehicle is traveling down a descending slope that is steeper than a predetermined reference gradient, the vehicle may possibly be accelerated at a speed not desired by the driver with restart of the engine. Idle stop is hence disabled under such a condition. The control device according to the present embodiment carries out the control processes described above even when idle stop is disabled due to the vehicle's traveling downhill. This can minimize lowering of fuel efficiency.

Idle-stop disabling conditions include a situation that requires vehicle starting responsiveness. Exemplary situations that require vehicle starting responsiveness include a situation where the manipulated variable of steering wheel is larger than a predetermined manipulated variable; more specifically, a situation where the vehicle is temporarily stopped midway through the right turn at an intersection, with the steering wheel being turned to the right. In such a situation, the driver merely temporarily stops the vehicle for safety confirmation, and is likely to start the vehicle immediately after confirming travelling safety, which means that the driver needs to restart the engine soon even if it has automatically stopped (stopped idling). Automatic stop of the engine may thus possibly result in deteriorating fuel efficiency (lowering of fuel efficiency) compared with the case where the engine does not automatically stop. Idle stop is hence disabled under such a condition. The control device according to the present embodiment carries out the control processes described above even when idle stop is disabled due to the vehicle's temporary stop midway through the turn at an intersection. This can minimize lowering of drivability and fuel efficiency.

In addition to the conditions described above, the vehicle may be in a situation where the driver decides to restart the engine immediately after its automatic stop. In such a situation as well, automatic stop of the engine may possibly result in fuel efficiency reduction (lowering of fuel efficiency) compared with the case where the engine does not automatically stop. Hence, the control device according to the present embodiment, on condition that the frequency of satisfying a restart condition is high, lowers the reference speed ve0 of the automatic stop condition [ii] by a predetermined value (first predetermined value) and sets it again (resets) before the predetermined time (first predetermined time) elapses after automatic stop of the engine. The control device according to the present embodiment changes an automatic stop condition to another one that is harder to be satisfied when the vehicle is assumed to often encounter a situation where the engine is restarted immediately after its automatic stop. This makes it possible to restrain unnecessary idle stops.

The control device according to the present embodiment, on condition that the frequency of satisfying a restart condition is low, raises the reference speed ve0 of the automatic stop condition [ii] by a predetermined value (first predetermined value) and sets it again before the predetermined time (second predetermined time) elapses after automatic stop of the engine. The control device according to the present embodiment changes an automatic stop condition to another one that is easier to be satisfied when the vehicle is assumed to rarely encounter a situation where the engine is restarted immediately after its automatic stop. This makes it possible to carry out idle stop more actively.

An auxiliary disabling condition includes that a period of time during which at least one of the lead storage battery 11 and the lithium-ion storage battery 12 is disabled from being charged (no-charging period) is predicted to be longer than a predetermined period (second predetermined period). For example, in a situation where the vehicle is predicted to travel on a congested section from this time forward, it is assumed to be hard to carry out regenerative charging during the period (while the vehicle is traveling the congested section). Assisting torque (assisting engine output) by means of the ISG 10 in such a situation will only cause the batteries 20 to discharge but not cause them to be charged. As a result, electric charge accumulated in the lead storage battery 11 and the lithium-ion storage battery 12 may possibly run out during the torque assistance. In this regard, the control device according to the present embodiment disables the ISG 10 to assist torque when it is assumed that neither the lead storage battery 11 nor the lithium-ion storage battery 12 can be charged. Accordingly, it is only the electric load 14 of the vehicle that consumes electric power, resulting in saving power consumption.

An auxiliary disabling condition includes a condition where at least one of the lead storage battery 11 and the lithium-ion storage battery 12 discharges more than it charges during a predetermined period. The control device according to the present embodiment disables the ISG 10 from providing assist torque in the case where one of the lead storage battery 11 and the lithium-ion storage battery 12 discharges more than it charges. Accordingly only the electric load 14 of the vehicle is supplied with electric power, thereby increasing energy efficiency in the entirely of the vehicle, compared with the case where the ISG 10 assists torque.

The control device according to the present embodiment lowers an allowable lower limit of use of each of the lead storage battery 11 and the lithium-ion storage battery 12 by a predetermined value when an idle-stop disabling condition is satisfied and idle stop is disabled. When the condition according to the present embodiment is satisfied and idle stop is disabled, the engine will not be automatically stopped. There is therefore no need to secure a charge amount required to restart the engine. Accordingly, the lead storage battery 11 and the lithium-ion storage battery 12 can be used until their charge drops to a low level that is not allowed in normal use.

The embodiment described above may be modified as follows.

In the embodiment described above, the lithium-ion storage battery 12 is employed as a (high-density) storage battery that provides less power loss during a charging/discharging period and has higher output and energy density than the lead storage battery 11; however, another kind of battery may be employed. In a modified example, a nickel hydride battery may be used.

The embodiment described above uses the following conditions as idle-stop disabling conditions.

[1] The changeover switch 40 is ON (Disablement of idle-stop is operative);

[2] The vehicle is traveling on a road (slope or step) that is steeper than a predetermined reference gradient; and

[3] Starting responsiveness of the vehicle is required.

In the embodiment described above, an idle-stop disabling condition is determined to be satisfied when at least one of the conditions [1] to [3] is satisfied. The idle-stop disabling conditions, however, are not limited to these. In a modified example, a new condition may be added to the [1] to [3] conditions. Specifically, at least one of the following conditions may be added as appropriate.

[4] Usage condition of the air conditioner does not satisfy a predetermined standard requirement (e.g., the air conditioner is in operation);

[5] Brake negative pressure is lower than a predetermined standard negative pressure;

[6] Vehicle conditions do not satisfy a predetermined standard requirement (e.g., engine water temperature is above a predetermined temperature, an ABS is in operation, and a driving wheel is skidding, etc.); and

[7] No driver is seated in the driver's seat.

In the present embodiment described above, an allowable lower limit of capacity of each of the lead storage battery 11 and the lithium-ion storage battery 12 is lowered by a predetermined value in a circumstance where an idle-stop disabling condition is satisfied and idle stop is disabled; however, there may be another option. In the above circumstance, the allowable lower limit of use for the capacity of each of the lead storage battery 11 and the lithium-ion storage battery 12 does not have to be necessarily lowered.

As shown in S170 of FIG. 2, in the embodiment described above, a control device carries out a process of determining whether a restart condition of the engine is satisfied within a predetermined period; however, there may be another option. In addition to the determination process of S170, a modified example may allow execution of a process of determining whether a restart condition of the engine is satisfied while the vehicle is traveling. Exemplary situations where a restart condition is satisfied while the vehicle is traveling even after the automatic stop of the engine (after idling stop) include an occasion when the vehicle repeats slowdown and normal traveling due to congestion. In this occasion, automatically stopping the engine is immediately followed by a restart, possibly resulting in fuel efficiency reduction (lowering of fuel efficiency). Then, in a modified example, when the engine is restarted during traveling, following the automatic engine stop, the reference speed ve0 of the automatic stop condition [ii] is lowered by a predetermined value (first predetermined value) for resetting. In the embodiment described above, when the engine is restarted during traveling after its automatic stop, an automatic stop condition is changed to another one that is harder to be satisfied. This makes it possible to restrain unnecessary idle stop.

As shown in S180 of FIG. 2, in the embodiment described above the control device carries out a process of determining whether the frequency of satisfying a restart condition of the engine is high before lapse of a predetermined period (first predetermined period) after automatic stop of the engine; however, there may be another option. In a modified example, this determination process (in S180) does not have to be carried out (may be omitted). In this case, the reference speed ve0 of the automatic stop condition [ii] is lowered by a predetermined value and is set again every time the engine restart condition is satisfied before lapse of the predetermined period. Restarting the engine based on the driver's decision immediately after automatic stop of the engine may possibly result in deterioration in fuel efficiency (lowering of fuel efficiency) compared with the case where the engine does not automatically stop. In this regard, in a modified example, on condition that the restart condition is satisfied before lapse of the predetermined period after the automatic stop of the engine, the reference speed ve0 of the automatic stop condition [ii] is lowered by a predetermined value and is set again. In the present modified example, an automatic stop condition is changed to another one that is harder to be satisfied when the engine is assumed to be restarted immediately after being automatically stopped. This makes it possible to restrain unnecessary idle stop.

As shown in S210 of FIG. 2, in the embodiment described above the control device carries out a process of determining whether the frequency of satisfying a restart condition of the engine is low, before lapse of a predetermined period (first predetermined period) after automatic stop of the engine; however there may be another option. In a modified example, this determination process (the S210 process) does not have to be necessarily carried out (may be omitted). In this case, the reference speed ve0 of the automatic stop condition [ii] is adjusted (increased/decreased) every time the control device determines whether a restart condition of the engine is satisfied before lapse of the predetermined period. This makes it possible to enable/disable idle stop according to a vehicle condition.

In a modified example, a process of determining whether the engine restart condition is satisfied during traveling may be carried out, instead of the determination process of S170 (process of determining whether the engine restart condition is satisfied within a predetermined period).

REFERENCE SIGNS LIST

10 . . . ISG
11 . . . Lead-acid battery
12 . . . Lithium-ion battery
30 . . . ECU
40 . . . Changeover Switch

The invention claimed is:

1. An internal combustion engine control device for a vehicle having: an internal combustion engine; and an electric motor connected to an output shaft of the internal combustion engine and applying torque to the output shaft by use of electric power supplied from storage batteries, comprising:
an automatic stop means for automatically stopping the internal combustion engine when an automatic stop condition is satisfied;
an automatic stop disabling means for disabling automatic stop from being carried out by the automatic stop means when an automatic stop disabling condition is satisfied; and
an auxiliary output means for decreasing an output of the internal combustion engine and increasing an output of the electric motor when the automatic stop condition is satisfied while automatic stop of the internal combustion engine has been disabled by the automatic stop disabling means.

2. The internal combustion engine control device according to claim 1, wherein the automatic stop disabling condition includes that a disabling instruction has been accepted from a driver via an interface switching between enabling and disabling of the automatic stop.

3. The internal combustion engine control device according to claim 1, wherein the automatic stop disabling condition includes that the vehicle is traveling on a road that is steeper than a predetermined gradient.

4. The internal combustion engine control device according to claim 1, wherein the automatic stop disabling condition includes that the vehicle requires starting responsiveness.

5. The internal combustion engine control device according to claim 1, wherein:
the internal combustion engine control device comprises a restarting means for automatically restarting the internal combustion engine when a restart condition is satisfied;
the automatic stop condition includes that a vehicle is traveling more slowly than a predetermined speed; and
the internal combustion engine control device lowers the predetermined speed by a first predetermined value and resets the predetermined speed before lapse of a first predetermined period from when the automatic stop disabling means automatically stops the internal combustion engine on an occasion when the restart condition is satisfied.

6. The internal combustion engine control device according to claim 5, wherein the internal combustion engine control device lowers the predetermined speed by the first predetermined value and resets the predetermined speed before lapse of the first predetermined period from when the automatic stop disabling means automatically stops the internal combustion engine on condition that a frequency of satisfying the restart condition is higher than a predetermined frequency.

7. The internal combustion engine control device according to claim 1, wherein:
the internal combustion engine control device comprises a restarting means for automatically restarting the internal combustion engine when a restart condition is satisfied;
the automatic stop condition includes that a vehicle is traveling more slowly than a predetermined speed; and
the internal combustion engine control device lowers the predetermined speed by a first predetermined value and resets the predetermined speed after the automatic stop disabling means automatically stops the internal combustion engine when the restart condition is satisfied while the vehicle is traveling.

8. The internal combustion engine control device according to claim 7, wherein the internal combustion engine control device lowers the predetermined speed by a first predetermined value and resets the predetermined speed after the automatic stop disabling means automatically stops the internal combustion engine on condition that frequency of satisfying the restart condition is higher than a predetermined frequency while the vehicle is traveling.

9. The internal combustion engine control device according to claim 1, wherein the internal combustion engine control device comprises an auxiliary disabling means for disabling control carried out by the auxiliary output means when an auxiliary disabling condition is satisfied, wherein
the auxiliary disabling condition includes that a period during which the storage battery is disabled from being charged is predicted to be longer than a second predetermined period.

10. The internal combustion engine control device according to claim 1, wherein
the internal combustion engine control device comprises an auxiliary disabling means for disabling control carried out by the auxiliary output means when an auxiliary disabling condition is satisfied, and
the auxiliary disabling condition includes that the storage battery discharges more than the storage battery charges during a predetermined period.

11. The internal combustion engine control device according to claim 1, wherein the control device lowers an allowable lower limit of use of capacity of the storage battery by a predetermined value in a case where the automatic stop disabling means disables the internal combustion engine from automatically stopping.

* * * * *